US011610071B2

(12) United States Patent
Springer

(10) Patent No.: US 11,610,071 B2
(45) Date of Patent: Mar. 21, 2023

(54) METHOD FOR PROVIDING ASYMMETRIC IDENTIFICATION AND ACCESS WITH RESPECT TO A RADIO-FREQUENCY TAG

(71) Applicant: EM Microelectronic-Marin SA, Marin (CH)

(72) Inventor: James Springer, Colorado Springs, CO (US)

(73) Assignee: EM Microelectronic-Marin SA, Marin (CH)

( * ) Notice: Subject to any disclaimer, the term of this patent is extended or adjusted under 35 U.S.C. 154(b) by 0 days.

(21) Appl. No.: 17/488,752

(22) Filed: Sep. 29, 2021

(65) Prior Publication Data

US 2022/0180079 A1    Jun. 9, 2022

(30) Foreign Application Priority Data

Dec. 7, 2020   (EP) .................................... 20212259

(51) Int. Cl.
*G06K 7/10* (2006.01)
*G06F 7/58* (2006.01)

(52) U.S. Cl.
CPC ......... *G06K 7/10366* (2013.01); *G06F 7/582* (2013.01)

(58) Field of Classification Search
CPC ... G06K 7/10366; G06K 7/0008; G06F 7/582
USPC .................... 235/492, 375; 340/572.1–572.9
See application file for complete search history.

(56) References Cited

U.S. PATENT DOCUMENTS

| 2008/0122583 | A1 | 5/2008 | Bekritsky |
| 2008/0180221 | A1 | 7/2008 | Tuttle |
| 2010/0001843 | A1* | 1/2010 | Bae ...................... G06K 7/0008 340/10.2 |
| 2011/0260838 | A1 | 10/2011 | Tuttle |
| 2018/0165482 | A1 | 6/2018 | Springer et al. |

FOREIGN PATENT DOCUMENTS

EP      3 333 755 A1    6/2018

OTHER PUBLICATIONS

European Search Report dated May 3, 2021 in European Application 20212259.4, filed on Dec. 7, 2020, 2 pages.

* cited by examiner

*Primary Examiner* — Jamara A Franklin
(74) *Attorney, Agent, or Firm* — Oblon, McClelland, Maier & Neustadt, L.L.P.

(57) ABSTRACT

A method for providing identification and access with respect to a passive radio-frequency tag in a tag population, including, receiving a command for initiating an inventory round or a command for initiating a tag access, the command including, as a parameter, a number including an identifier of a reader, generating a 16-bit value referred to as first or second binding handle, the first or second binding handle including N juxtaposed bits forming the reader identifier, backscattering the first or second binding handle, receiving an ACK command, analyzing the identification parameter of the ACK command, and in a case where the identification parameter includes the reader identifier then ignoring the ACK command, only tags having the selected inventoried flag value for the session number are inventoried, the first initiating command only including the same inventoried flag for every inventoried tags during a session and wherein the at least other inventoried flag value is never used during the session.

8 Claims, 18 Drawing Sheets

| | Reader E | Communic-ation Slot | | Timing | Tag(s) |
|---|---|---|---|---|---|
| 1 | RF field | n/a | → | none | All Tags are in Ready state |
| 2 | Select (Session Sx=S2, Inventory flag value IFVx=A) | n/a | → | none | All Tags set Inventory Flag Value for Session S2 to A |
| 3 | Query (Session Sx=S2, Inventory flag value IFV=A, Slot number Q=8) | 0 | → | none | All Tags with Inventory Flag Value A for Session S2 (i.e. all Tags) generate RN16 and Q-bit value |
| 4 | no Tag responds & T1 timeout occurs | 0 | ← | T1 | Tag with value in Slot counter=0 (i.e. no Tag) sends RN16 |
| 5 | QueryRep (Session Sx=S2) | 1 | → | T2 | All Tags in Arbitrate for Session S2 (i.e. Tags 1, 2, 3) decrement value in Slot Counter |
| 6 | Received RN16=1111 | 1 | ← | T1 | Tag with value in Slot counter=0 (i.e. Tag 1) sends RN16 |
| 7 | ACK (RN16=1111) | 1 | → | T2 | Acknowledge Tag with RN16=1111 (i.e. Tag 1) |
| 8 | Received EPC code | 1 | ← | T1 | Tag with RN16=1111 (i.e. Tag 1) sends EPC code |
| 9 | Req_RN (RN16=1111) | 1 | → | T2 | Initiate access to Tag with RN16=1111 (i.e. Tag 1). Tag with RN16=1111 (i.e. Tag 1) generates second binding handle |
| 10 | Received handle=6666 | 1 | ← | T1 | Tag with RN16=1111 (i.e. Tag 1) sends handle=6666 |
| 11 | Authenticate (handle=6666) | 1 | → | none | Crypto challenge for Tag with handle=6666 (i.e. Tag 1) |
| 12 | Received crypto response | 1 | ← | T6 | Tag with handle=6666 (i.e. Tag 1) sends crypto response |
| 13 | QueryRep (Session Sx=S2) | 2 | → | none | All Tags in Arbitrate for Session S2 (i.e. Tags 2, 3) decrement value in Slot Counter |
| 14 | Received RN16=2222 | 2 | ← | T1 | Tag with value in Slot counter=0 (i.e. Tag 2) sends RN16 |
| 15 | ACK (RN16=2222) | 2 | → | T2 | Acknowledge Tag with RN16=2222 (i.e. Tag 2) |
| 16 | Received EPC code | 2 | ← | T1 | Tag with RN16=2222 (i.e. Tag 2) sends EPC code |
| 17 | Req_RN (RN16=2222) | 2 | → | T2 | Initiate access to Tag with RN16=2222 (i.e. Tag 2). Tag with RN16=2222 (i.e. Tag 2) generates second binding handle |
| 18 | Received handle=7777 | 2 | ← | T1 | Tag with RN16=2222 (i.e. Tag 2) sends handle=7777 |

FIG. 2A

| | | | | | |
|---|---|---|---|---|---|
| 19 | Authenticate (handle=7777) | 2 | → | none | Crypto challenge for Tag with handle=7777 (i.e. Tag 2) |
| 20 | Received crypto response | 2 | ← | T6 | Tag with handle=7777 (i.e. Tag 2) sends crypto response |
| 21 | QueryRep (Session Sx=S2) | 3 | → | none | All Tags in Arbitrate for Session S2 (i.e. Tag 3) decrement value in Slot Counter |
| 22 | Received RN16=3333 | 3 | ← | T1 | Tag with value in Slot counter=0 (i.e. Tag 3) sends RN16 |
| 23 | ACK (RN16=3333) | 3 | → | T2 | Acknowledge Tag with RN16=3333 (i.e. Tag 3) |
| 24 | Received EPC code | 3 | ← | T1 | Tag with RN16=3333 (i.e. Tag 3) sends EPC code |
| 25 | Req_RN (RN16=3333) | 3 | → | T2 | Initiate access to Tag with RN16=3333 (i.e. Tag 3). Tag with RN16=3333 (i.e. Tag 3) generates second binding handle |
| 26 | Received handle=8888 | 3 | ← | T1 | Tag with RN16=3333 (i.e. Tag 3) sends handle=8888 |
| 27 | Authenticate (handle=8888) | 3 | → | none | Crypto challenge for Tag with handle=8888 (i.e. Tag 3) |
| 28 | Received crypto response | 3 | ← | T6 | Tag with handle=8888 (i.e. Tag 3) sends crypto response |
| 29 | QueryRep (Session Sx=S2) | 4 | → | none | All Tags in Arbitrate for Session S2 (i.e. no Tag) decrement value in Slot counter |
| 30 | no Tag responds & T1 timeout occurs | 4 | ← | T1 | Tag with value in Slot counter=0 (i.e. no Tag) sends RN16 |
| 31 | QueryRep (Session Sx=2) | 5 | → | none | All Tags in Arbitrate for Session S2 (i.e. no Tag) decrement value in Slot counter |
| 32 | no Tag responds & T1 timeout occurs | 5 | ← | T1 | Tag with value in Slot counter=0 (i.e. no Tag) sends RN16 |
| 33 | QueryRep (Session Sx=2) | 6 | → | none | All Tags in Arbitrate for Session S2 (i.e. no Tag) decrement value in Slot counter |
| 34 | no Tag responds & T1 timeout occurs | 6 | ← | T1 | Tag with value in Slot counter=0 (i.e. no Tag) sends RN16 |
| 35 | QueryRep (Session Sx=2) | 7 | → | none | all Tags in Arbitrate for Session S2 (i.e. no Tag) decrement the value in the Slot Counter |
| 36 | no Tag responds & T1 timeout occurs | 7 | ← | T1 | Tag with value in Slot counter=0 (i.e. no Tag) sends RN16 |

FIG. 2B

| | Tag 1 (only in read zone for Reader E) | | | | |
|---|---|---|---|---|---|
| | Tag State | Slot Counter | RN16 or handle | Session | Inventory Flag Value |
| 1 | Ready | undefined | n/a | Undefined | n/a |
| 2 | Ready | undefined | n/a | S2 | A |
| 3 | Arbitrate | 1 | 1111 | S2 | A |
| 4 | Arbitrate | 1 | 1111 | S2 | A |
| 5 | Reply | 0 | 1111 | S2 | A |
| 6 | Reply | 0 | 1111 | S2 | A |
| 7 | Acknowledged | 0 | 1111 | S2 | A |
| 8 | Acknowledged | 0 | 1111 | S2 | A |
| 9 | Open/Secured | 0 | 6666 | S2 | A |
| 10 | Open/Secured | 0 | 6666 | S2 | A |
| 11 | Open | 0 | 6666 | S2 | A |
| 12 | Open | 0 | 6666 | S2 | A |
| 13 | Ready | 0 | 6666 | S2 | B |
| 14 | Ready | 0 | 6666 | S2 | B |
| 15 | Ready | 0 | 6666 | S2 | B |
| 16 | Ready | 0 | 6666 | S2 | B |
| 17 | Ready | 0 | 6666 | S2 | B |
| 18 | Ready | 0 | 6666 | S2 | B |
| 19 | Ready | 0 | 6666 | S2 | B |
| 20 | Ready | 0 | 6666 | S2 | B |
| 21 | Ready | 0 | 6666 | S2 | B |
| 22 | Ready | 0 | 6666 | S2 | B |
| 23 | Ready | 0 | 6666 | S2 | B |
| 24 | Ready | 0 | 6666 | S2 | B |
| 25 | Ready | 0 | 6666 | S2 | B |
| 26 | Ready | 0 | 6666 | S2 | B |
| 27 | Ready | 0 | 6666 | S2 | B |
| 28 | Ready | 0 | 6666 | S2 | B |
| 29 | Ready | 0 | 6666 | S2 | B |
| 30 | Ready | 0 | 6666 | S2 | B |
| 31 | Ready | 0 | 6666 | S2 | B |

FIG. 3A

| 32 | Ready | 0 | 6666 | S2 | B |
|----|-------|---|------|----|----|
| 33 | Ready | 0 | 6666 | S2 | B |
| 34 | Ready | 0 | 6666 | S2 | B |
| 35 | Ready | 0 | 6666 | S2 | B |
| 36 | Ready | 0 | 6666 | S2 | B |

FIG. 3B

| | Tag 2 (only in read zone for Reader E) | | | | |
|---|---|---|---|---|---|
| | Tag State | Slot Counter | RN16 or handle | Session | Inventory Flag Value |
| 1 | Ready | undefined | n/a | undefined | n/a |
| 2 | Ready | undefined | n/a | S2 | A |
| 3 | Arbitrate | 2 | 2222 | S2 | A |
| 4 | Arbitrate | 2 | 2222 | S2 | A |
| 5 | Arbitrate | 1 | 2222 | S2 | A |
| 6 | Arbitrate | 1 | 2222 | S2 | A |
| 7 | Arbitrate | 1 | 2222 | S2 | A |
| 8 | Arbitrate | 1 | 2222 | S2 | A |
| 9 | Arbitrate | 1 | 2222 | S2 | A |
| 10 | Arbitrate | 1 | 2222 | S2 | A |
| 11 | Arbitrate | 1 | 2222 | S2 | A |
| 12 | Arbitrate | 1 | 2222 | S2 | A |
| 13 | Reply | 0 | 2222 | S2 | A |
| 14 | Reply | 0 | 2222 | S2 | A |
| 15 | Acknowledged | 0 | 2222 | S2 | A |
| 16 | Acknowledged | 0 | 2222 | S2 | A |
| 17 | Open/Secured | 0 | 7777 | S2 | A |
| 18 | Open/Secured | 0 | 7777 | S2 | A |
| 19 | Open | 0 | 7777 | S2 | A |
| 20 | Open | 0 | 7777 | S2 | A |
| 21 | Ready | 0 | 7777 | S2 | B |
| 22 | Ready | 0 | 7777 | S2 | B |
| 23 | Ready | 0 | 7777 | S2 | B |
| 24 | Ready | 0 | 7777 | S2 | B |
| 25 | Ready | 0 | 7777 | S2 | B |
| 26 | Ready | 0 | 7777 | S2 | B |
| 27 | Ready | 0 | 7777 | S2 | B |
| 28 | Ready | 0 | 7777 | S2 | B |
| 29 | Ready | 0 | 7777 | S2 | B |
| 30 | Ready | 0 | 7777 | S2 | B |
| 31 | Ready | 0 | 7777 | S2 | B |

FIG. 4A

| 32 | Ready | 0 | 7777 | S2 | B |
|----|-------|---|------|----|----|
| 33 | Ready | 0 | 7777 | S2 | B |
| 34 | Ready | 0 | 7777 | S2 | B |
| 35 | Ready | 0 | 7777 | S2 | B |
| 36 | Ready | 0 | 7777 | S2 | B |

FIG 4B

| | Tag 3 (in read zones for both Reader E and Reader G) | | | | |
|---|---|---|---|---|---|
| | Tag State | Slot Counter | RN16 or handle | Session | Inventory Flag Value |
| 1 | Ready | undefined | n/a | undefined | n/a |
| 2 | Ready | undefined | n/a | S2 | A |
| 3 | Arbitrate | 3 | 3333 | S2 | A |
| 4 | Arbitrate | 3 | 3333 | S2 | A |
| 5 | Arbitrate | 2 | 3333 | S2 | A |
| 6 | Arbitrate | 2 | 3333 | S2 | A |
| 7 | Arbitrate | 2 | 3333 | S2 | A |
| 8 | Arbitrate | 2 | 3333 | S2 | A |
| 9 | Arbitrate | 2 | 3333 | S2 | A |
| 10 | Arbitrate | 2 | 3333 | S2 | A |
| 11 | Arbitrate | 2 | 3333 | S2 | A |
| 12 | Arbitrate | 2 | 3333 | S2 | A |
| 13 | Arbitrate | 1 | 3333 | S2 | A |
| 14 | Arbitrate | 1 | 3333 | S2 | A |
| 15 | Arbitrate | 1 | 3333 | S2 | A |
| 16 | Arbitrate | 1 | 3333 | S2 | A |
| 17 | Arbitrate | 1 | 3333 | S2 | A |
| 18 | Arbitrate | 1 | 3333 | S2 | A |
| 19 | Arbitrate | 1 | 3333 | S2 | A |
| 20 | Arbitrate | 1 | 3333 | S2 | A |
| 21 | Reply | 0 | 3333 | S2 | A |
| 22 | Reply | 0 | 3333 | S2 | A |
| 23 | Acknowledged | 0 | 3333 | S2 | A |
| 24 | Acknowledged | 0 | 3333 | S2 | A |
| 25 | Open/Secured | 0 | 8888 | S2 | A |
| 26 | Open/Secured | 0 | 8888 | S2 | A |
| 27 | Open | 0 | 8888 | S2 | A |
| 28 | Open | 0 | 8888 | S2 | A |
| 29 | Ready | 0 | 8888 | S2 | B |
| 30 | Ready | 0 | 8888 | S2 | B |
| 31 | Ready | 0 | 8888 | S2 | B |

FIG. 5A

| 32 | Ready | 0 | 8888 | S2 | B |
| 33 | Ready | 0 | 8888 | S2 | B |
| 34 | Ready | 0 | 8888 | S2 | B |
| 35 | Ready | 0 | 8888 | S2 | B |
| 36 | Ready | 0 | 8888 | S2 | B |

FIG. 5B

| | Reader E (using Reader identifier C) | Communication Slot | | Timing | Tag(s) |
|---|---|---|---|---|---|
| 1 | RF field | n/a | → | none | All Tags are in Ready state |
| 2 | Inventory initiating command (Session Sx=S2, Inventory flag value IFVx=A, Slot-count parameter Q=8, Reader identifier RD=C) | 0 | → | none | All Tags set Inventory Flag Value for Session S2 to A, and generate first binding handle and Q-bit value |
| 3 | no Tag responds & T1 timeout occurs | 0 | ← | T1 | Tag with value in Slot counter=0 (i.e. no Tag) sends first binding handle |
| 4 | QueryRep (Session Sx=S2) | 1 | → | T2 | All Tags in Arbitrate for Session S2 (i.e. Tags 1, 2, 3) decrement value in Slot Counter |
| 5 | Received first binding handle=C661 | 1 | ← | T1 | Tag with value in Slot counter=0 (i.e. Tag 1) sends first binding handle |
| 6 | ACK (first binding handle=C661) | 1 | → | T2 | Acknowledge Tag with first binding handle=C661 (i.e. Tag 1) |
| 7 | Received EPC code | 1 | ← | T1 | Tag with first binding handle=C661 (i.e. Tag 1) sends EPC code |
| 8 | Req_RN (first binding handle=C661) | 1 | → | T2 | Initiate access to Tag with first binding handle=C661 (i.e. Tag 1). Tag with first binding handle=C661 (i.e. Tag 1) generates second binding handle |
| 9 | Received second binding handle=CDD1 | 1 | ← | T1 | Tag with first binding handle=C661 (i.e. Tag 1) sends second binding handle=CDD1 |
| 10 | Authenticate (second binding handle=CDD1) | 1 | → | none | Crypto challenge for Tag with second binding handle=CDD1 (i.e. Tag 1) |
| 11 | Received crypto response | 1 | ← | T6 | Tag with second binding handle=CDD1 (i.e. Tag 1) sends crypto response |
| 12 | QueryRep (Session Sx=S2) | 2 | → | none | All Tags in Arbitrate for Session S2 (i.e. Tags 2, 3) decrement value in Slot Counter |
| 13 | Received first binding handle=C772 | 2 | ← | T1 | Tag with value in Slot counter=0 (i.e. Tag 2) sends first binding handle |
| 14 | ACK (first binding handle=C772) | 2 | → | T2 | Acknowledge Tag with first binding handle=C772 (i.e. Tag 2) |
| 15 | Received EPC code | 2 | ← | T1 | Tag with first binding handle=C772 (i.e. Tag 2) sends EPC code |

FIG. 6A

| | | | | | |
|---|---|---|---|---|---|
| 16 | Req_RN (first binding handle=C772) | 2 | → | T2 | Initiate access to Tag with first binding handle=C772 (i.e. Tag 2). Tag with first binding handle=C772 (i.e. Tag 2) generates second binding handle |
| 17 | Received second binding handle=CEE2 | 2 | ← | T1 | Tag with first binding handle=C772 (i.e. Tag 2) sends second binding handle=CEE2 |
| 18 | Authenticate (second binding handle=CEE2) | 2 | → | none | Crypto challenge for Tag with second binding handle=CEE2 (i.e. Tag 2) |
| 19 | Received crypto response | 2 | ← | T6 | Tag with second binding handle=CEE2 (i.e. Tag 2) sends crypto response |
| 20 | QueryRep (Session Sx=S2) | 3 | → | none | All Tags in Arbitrate for Session S2 (i.e. Tag 3) decrement value in Slot Counter |
| 21 | Received first binding handle=C883 | 3 | ← | T1 | Tag with value in Slot counter=0 (i.e. Tag 3) sends first binding handle |
| 22 | ACK (first binding handle=C883) | 3 | → | T2 | Acknowledge Tag with first binding handle=C883 (i.e. Tag 3) |
| 23 | Received EPC code | 3 | ← | T1 | Tag with first binding handle=C883 (i.e. Tag 3) sends EPC code |
| 24 | Req_RN (first binding handle=C883) | 3 | → | T2 | Initiate access to Tag with first binding handle=C883 (i.e. Tag 3). Tag with first binding handle=C883 (i.e. Tag 3) generates second binding handle |
| 25 | Received second binding handle=CFF3 | 3 | ← | T1 | Tag with first binding handle=C883 sends second binding handle=CFF3 (i.e. Tag 3) |
| 26 | Authenticate (second binding handle=CFF3) | 3 | → | none | Crypto challenge for Tag with second binding handle=CFF3 (i.e. Tag 3) |
| 27 | Received crypto response | 3 | ← | T6 | Tag with second binding handle=CFF3 (i.e. Tag 3) sends crypto response |
| 28 | QueryRep (Session Sx=S2) | 4 | → | none | All Tags in Arbitrate for Session S2 (i.e. no Tag) decrement value in Slot Counter |
| 29 | no Tag responds & T1 timeout occurs | 4 | ← | T1 | Tag with value in Slot counter=0 (i.e. no Tag) sends first binding handle |
| 30 | QueryRep (Session Sx=2) | 5 | → | none | All Tags in Arbitrate for Session S2 (i.e. no Tag) decrement value in Slot Counter |

FIG. 6B

| | | | | | |
|---|---|---|---|---|---|
| 31 | no Tag responds & T1 timeout occurs | 5 | ← | T1 | Tag with value in Slot counter=0 (i.e. no Tag) sends first binding handle |
| 32 | QueryRep (Session Sx=2) | 6 | → | none | All Tags in Arbitrate for Session S2 (i.e. no Tag) decrement value in Slot Counter |
| 33 | no Tag responds & T1 timeout occurs | 6 | ← | T1 | Tag with value in Slot counter=0 (i.e. no Tag) sends first binding handle |
| 34 | QueryRep (Session Sx=2) | 7 | → | none | All Tags in Arbitrate for Session S2 (i.e. no Tag) decrement value in Slot Counter |
| 35 | no Tag responds & T1 timeout occurs | 7 | ← | T1 | Tag with value in Slot counter=0 (i.e. no Tag) sends first binding handle |

FIG. 6C

| | Tag 1 (only in read zone for Reader E) | | | | |
|---|---|---|---|---|---|
| | Tag State | Slot Counter | RN16 or handle | Session | Inventory Flag Value |
| 1 | Ready | undefined | n/a | Undefined | n/a |
| 2 | Arbitrate | 1 | C661 | S2 | A |
| 3 | Arbitrate | 1 | C661 | S2 | A |
| 4 | Reply | 0 | C661 | S2 | A |
| 5 | Reply | 0 | C661 | S2 | A |
| 6 | Acknowledged | 0 | C661 | S2 | A |
| 7 | Acknowledged | 0 | C661 | S2 | A |
| 8 | Open/Secured | 0 | CDD1 | S2 | A |
| 9 | Open/Secured | 0 | CDD1 | S2 | A |
| 10 | Open | 0 | CDD1 | S2 | A |
| 11 | Open | 0 | CDD1 | S2 | A |
| 12 | Ready | 0 | CDD1 | S2 | B |
| 13 | Ready | 0 | CDD1 | S2 | B |
| 14 | Ready | 0 | CDD1 | S2 | B |
| 15 | Ready | 0 | CDD1 | S2 | B |
| 16 | Ready | 0 | CDD1 | S2 | B |
| 17 | Ready | 0 | CDD1 | S2 | B |
| 18 | Ready | 0 | CDD1 | S2 | B |
| 19 | Ready | 0 | CDD1 | S2 | B |
| 20 | Ready | 0 | CDD1 | S2 | B |
| 21 | Ready | 0 | CDD1 | S2 | B |
| 22 | Ready | 0 | CDD1 | S2 | B |
| 23 | Ready | 0 | CDD1 | S2 | B |
| 24 | Ready | 0 | CDD1 | S2 | B |
| 25 | Ready | 0 | CDD1 | S2 | B |
| 26 | Ready | 0 | CDD1 | S2 | B |
| 27 | Ready | 0 | CDD1 | S2 | B |
| 28 | Ready | 0 | CDD1 | S2 | B |
| 29 | Ready | 0 | CDD1 | S2 | B |
| 30 | Ready | 0 | CDD1 | S2 | B |
| 31 | Ready | 0 | CDD1 | S2 | B |

FIG. 7A

| 32 | Ready | 0 | CDD1 | S2 | B |
| 33 | Ready | 0 | CDD1 | S2 | B |
| 34 | Ready | 0 | CDD1 | S2 | B |
| 35 | Ready | 0 | CDD1 | S2 | B |

FIG. 7B

| | Tag 2 (only in read zone for Reader E) | | | | |
|---|---|---|---|---|---|
| | Tag State | Slot Counter | RN16 or handle | Session | Inventory Flag Value |
| 1 | Ready | undefined | n/a | undefined | n/a |
| 2 | Arbitrate | 2 | C772 | S2 | A |
| 3 | Arbitrate | 2 | C772 | S2 | A |
| 4 | Arbitrate | 1 | C772 | S2 | A |
| 5 | Arbitrate | 1 | C772 | S2 | A |
| 6 | Arbitrate | 1 | C772 | S2 | A |
| 7 | Arbitrate | 1 | C772 | S2 | A |
| 8 | Arbitrate | 1 | C772 | S2 | A |
| 9 | Arbitrate | 1 | C772 | S2 | A |
| 10 | Arbitrate | 1 | C772 | S2 | A |
| 11 | Arbitrate | 1 | C772 | S2 | A |
| 12 | Reply | 0 | C772 | S2 | A |
| 13 | Reply | 0 | C772 | S2 | A |
| 14 | Acknowledged | 0 | C772 | S2 | A |
| 15 | Acknowledged | 0 | C772 | S2 | A |
| 16 | Open/Secured | 0 | CEE2 | S2 | A |
| 17 | Open/Secured | 0 | CEE2 | S2 | A |
| 18 | Open | 0 | CEE2 | S2 | A |
| 19 | Open | 0 | CEE2 | S2 | A |
| 20 | Ready | 0 | CEE2 | S2 | B |
| 21 | Ready | 0 | CEE2 | S2 | B |
| 22 | Ready | 0 | CEE2 | S2 | B |
| 23 | Ready | 0 | CEE2 | S2 | B |
| 24 | Ready | 0 | CEE2 | S2 | B |
| 25 | Ready | 0 | CEE2 | S2 | B |
| 26 | Ready | 0 | CEE2 | S2 | B |
| 27 | Ready | 0 | CEE2 | S2 | B |
| 28 | Ready | 0 | CEE2 | S2 | B |
| 29 | Ready | 0 | CEE2 | S2 | B |
| 30 | Ready | 0 | CEE2 | S2 | B |
| 31 | Ready | 0 | CEE2 | S2 | B |

FIG. 8A

| 32 | Ready | 0 | CEE2 | S2 | B |
| 33 | Ready | 0 | CEE2 | S2 | B |
| 34 | Ready | 0 | CEE2 | S2 | B |
| 35 | Ready | 0 | CEE2 | S2 | B |

FIG. 8B

|  | Tag 3 (in read zones for both Reader E and Reader G) | | | | |
|---|---|---|---|---|---|
|  | Tag State | Slot Counter | RN16 or handle | Session | Inventory Flag Value |
| 1 | Ready | undefined | n/a | undefined | n/a |
| 2 | Arbitrate | 3 | C883 | S2 | A |
| 3 | Arbitrate | 3 | C883 | S2 | A |
| 4 | Arbitrate | 2 | C883 | S2 | A |
| 5 | Arbitrate | 2 | C883 | S2 | A |
| 6 | Arbitrate | 2 | C883 | S2 | A |
| 7 | Arbitrate | 2 | C883 | S2 | A |
| 8 | Arbitrate | 2 | C883 | S2 | A |
| 9 | Arbitrate | 2 | C883 | S2 | A |
| 10 | Arbitrate | 2 | C883 | S2 | A |
| 11 | Arbitrate | 2 | C883 | S2 | A |
| 12 | Arbitrate | 1 | C883 | S2 | A |
| 13 | Arbitrate | 1 | C883 | S2 | A |
| 14 | Arbitrate | 1 | C883 | S2 | A |
| 15 | Arbitrate | 1 | C883 | S2 | A |
| 16 | Arbitrate | 1 | C883 | S2 | A |
| 17 | Arbitrate | 1 | C883 | S2 | A |
| 18 | Arbitrate | 1 | C883 | S2 | A |
| 19 | Arbitrate | 1 | C883 | S2 | A |
| 20 | Reply | 0 | C883 | S2 | A |
| 21 | Reply | 0 | C883 | S2 | A |
| 22 | Acknowledged | 0 | C883 | S2 | A |
| 23 | Acknowledged | 0 | C883 | S2 | A |
| 24 | Open/Secured | 0 | CFF3 | S2 | A |
| 25 | Open/Secured | 0 | CFF3 | S2 | A |
| 26 | Open | 0 | CFF3 | S2 | A |
| 27 | Open | 0 | CFF3 | S2 | A |
| 28 | Ready | 0 | CFF3 | S2 | B |
| 29 | Ready | 0 | CFF3 | S2 | B |
| 30 | Ready | 0 | CFF3 | S2 | B |
| 31 | Ready | 0 | CFF3 | S2 | B |

FIG. 9A

| 32 | Ready | 0 | CFF3 | S2 | B |
| 33 | Ready | 0 | CFF3 | S2 | B |
| 34 | Ready | 0 | CFF3 | S2 | B |
| 35 | Ready | 0 | CFF3 | S2 | B |

FIG. 9B

METHOD FOR PROVIDING ASYMMETRIC IDENTIFICATION AND ACCESS WITH RESPECT TO A RADIO-FREQUENCY TAG

CROSS-REFERENCE TO RELATED APPLICATION

This application claims priority to European Patent Application No. 20212259.4 filed on Dec. 7, 2020, the entire disclosure of which is hereby incorporated herein by reference.

FIELD OF INVENTION

The invention relates to the field of radio-frequency identity protocols, defining the physical and logical requirements for communications between passive transponders (tags) and readers. The present invention relates particularly to a method for providing asymmetric identification and access with respect to a radio-frequency passive tag.

In radio frequency identification, the term tag or transponder refers to a device configured to emit an identifying signal in response to an interrogating received signal. A RFID tag does not necessarily have an internal power supply or battery of its own, in this case the power required to energize the transponder is obtained from an electromagnetic field generated by a reader, also known as interrogator, used to interrogate the tag. Such a tag relies purely on backscatter communication. The term passive refers to tags of this type.

BACKGROUND OF THE INVENTION

A radio-frequency identification (RFID) system comprises readers, also known as interrogators, and tags, also known as labels or transponders. One or more RFID readers may communicate with one or more RFID tags in any numbers of ways. Some such ways are called protocols which call for specific manners of signaling between readers and tags. EPC UHF Gen2 Air Interface Protocol is a widely used protocol, which defines physical and logical requirements for a passive tag, in a case where a reader talks first, throughout the 860 to 960 MHz frequency range. The term "Gen2V2 protocol" will be used to refer to this protocol in the subsequent text.

According to the Gen2V2 protocol, readers manage a tag population within their effective read zone using three basic operations. Each of these operations may comprise multiple commands. The operations are defined as follows:

Select, to choose a tag population. The set of commands dedicated to the Select operation includes the Select command.

Inventory, to identify individual tags within the tag population. The set of commands dedicated to the Inventory operation includes Query, QueryAdjust, QueryRep, ACK and NAK commands.

Access, to communicate with an identified tag. The reader may perform a core operation such as reading, writing, locking, or killing the tag; a security-related operation such as authenticating the tag; or a file-related operation such as opening a particular file in the tag's memory. The set of commands dedicated to the Access operation includes, among others, Req_RN and Authenticate commands.

Readers support and tags provide 4 sessions, denoted S0, S1, S2 and S3. Tags participate in one and only one session during an inventory round, and two or more readers can use sessions to independently inventory a common tag population. Each tag comprises four flags denoted 'inventoried flags', each inventoried flag being associated with one of the four sessions. A tag shall maintain an independent inventoried flag for each of its four sessions, and each inventoried flag may have two values, either value A or value B.

Moreover, each tag has a slot counter and a state, which may be implemented all along the Select, Inventory and Access operations. A slot counter contains a value, said value being used to determine the point in an inventory round at which a tag may respond, as it will be explained later. A state characterizes the tag's behavior and response to a reader command. The tag state set includes Ready, Arbitrate, Reply, Acknowledged, Open, Secured and Killed.

Ready is a holding state for energized tags that are neither Killed nor currently participating in an Inventory round: upon entering an energizing radio-frequency (RF) field, a tag that is not killed shall enter the Ready state. A reader may first issue a Select command to select a population of tags in the Ready state. The Select command can set a tag's inventoried flag to either A or B in any one of the four sessions. In this case, the Select command comprises configuration parameters among which a session number and an inventoried flag value. The Select command also comprises selection criteria, which won't be detailed here. Upon receiving a Select command, each tag evaluates the selection criteria, and depending on the evaluation may set the inventoried flag of the session specified in the command to the value specified in the command.

Subsequently, a reader shall issue a Query command. Query initiates an Inventory round and decides which tags participate in the round. A Query command comprises a session number, an inventoried flag value, and an integer in the range (0, 15), denoted slot-count parameter Q. The slot-count parameter sets the number of slots in the inventory round. Upon receiving a Query command, tags with the matching inventoried flag value for the specified session shall draw a Q-bit random value from their random number generator or pseudo-random number generator, and load said value into their slot counter. Subsequently, a tag shall transition to the Arbitrate state and remain silent if the value in its slot counter is nonzero, or transition to the Reply state if the value in its slot counter is zero.

Arbitrate is a holding state for tags that are participating in the current inventory round and whose slot counters hold nonzero values. After issuing a Query command but receiving no response within a time T1 called 'Immediate reply time', the reader typically issues one or more QueryAdjust or QueryRep commands. A QueryAdjust command comprises the session number in the previous Query, but a higher or a smaller slot-count parameter Q. A tag in Arbitrate state shall adjust the value in its slot counter upon receiving a QueryAdjust corresponding to the inventory round currently in progress, then pick a new Q-bit number, and load it into its slot counter. Subsequently, the tag shall transition to the Reply state if said number is zero, or stay in the Arbitrate state if said number is nonzero. A QueryRep command comprises the session number of the previous Query without changing the slot-count parameter. In the Arbitrate state, the tag shall decrement by one the value in its slot counter every time it receives a QueryRep corresponding to the inventory round currently in progress, and it shall transition to the Reply state when the value in its slot counter reaches zero. It should be noted that a tag in the Acknowledged, Open, or Secured state that receives a QueryRep command whose session parameter matches the session parameter in the prior Query, and that is not in the middle of a Kill or an Access command sequence shall invert its inventoried flag (i.e. A→B or B→A, as appropriate) for the current session and transition to Ready.

Upon entering the Reply state, the tag shall backscatter a 16-bit random or pseudo-random number (called RN16). In response, the reader shall acknowledge the tag by echoing the tag's backscattered RN16. This shall be done by sending an ACK command comprising the RN16. Thus, if the tag receives an ACK command containing an identical RN16 (a valid ACK command), it shall transition to the Acknowledged state. Subsequently, the tag shall send an EPC code, stored in a part of its memory called 'EPC memory'. The EPC code identifies the object to which the Tag is or will be attached. It should be noted that another ACK command comprising the RN16 may be sent again to the tag in said Acknowledged state, so as to receive the EPC code again. On the contrary, if the tag fails to receive an ACK command within a time T2 or receives an invalid ACK (that is to say an ACK command including a different RN16), then it shall return to the Arbitrate state.

Access always begins with a reader moving a tag from the Acknowledged state to either the Open or the Secured state by issuing a Req_RN command comprising said tag's RN16. If the tag in the Acknowledged state receives a Req_RN with a correct RN16, it shall generate, store and backscatter a new 16-bit random or pseudo-random number, denoted handle, and transition to the Open or Secured state. Subsequently, if the reader wants to ensure that only this tag is in the Open or Secured state, then it may issue an ACK command with said handle as a parameter. The tag that receives the ACK command with the correct handle shall reply by backscattering said handle and remain in its current state (Open or Secured, as appropriate), whereas those that receive an ACK command with an incorrect handle shall transition from the Open or Secured state to the Arbitrate state.

The choice of transitioning to the Open or to the Secured state when receiving a Req_RN command with a correct handle depends on the tag's access password, said access password being a value stored in a memory of the tag. It should be noted that a tag in the Open state may execute some commands only, whereas a tag in the Secured state with appropriate privileges may execute all commands. A tag in the Open state shall transition to the Secured state after a successful authentication. In order to initiate said authentication, a reader may issue an Authenticate command, said command comprising the tag's handle.

A reader and a tag can communicate indefinitely in the Open or Secured state, but the reader may end the communication at any time in order to identify and access other tags by issuing a QueryRep command. In this case, the tag shall transition from the Open or Secured state to the Ready state. The whole process ends when the reader has issued Q−1 QueryRep commands subsequent to a Query command, where Q is the slot-count parameter comprised in said Query command.

FIG. 1 shows a RFID system comprising two readers, Reader E and Reader G, and a Tag population comprising five Tags 1, 2, 3, 4, 5. Tags 1, 2 and 3 are in the effective read zone for Reader E, and Tags 3, 4 and 5 are in the effective read zone for Reader G. This means Tags 1, 2 and 3 can receive operating energy and commands, and backscatter responses from a RF field generated by Reader E, and Tags 3, 4 and 5 can receive operating energy and commands, and backscatter responses from a RF field generated by Reader G.

By way of example only, FIGS. 2A and 2B illustrate an inventory and access sequence between Reader E and Tags 1, 2 and 3 according to the Gen2V2 protocol. First column relates to Reader E, and shows in particular commands that Reader E issues, and responses that Reader E receives during the communication sequence. Last column relates to the Tags, and in particular shows actions performed by a Tag in response to a command received from Reader E. The middle column shows messages directions: an arrow pointing right indicates a command from Reader E to at least a Tag; an arrow pointing left indicates a response from at least a tag to Reader E. The second column shows the communication slot, which starts from zero and is incremented by one every time Reader E issues a QueryRep command subsequently to a Query command. When the communication slot reaches Q−1, where Q is the slot-count parameter included in the Query command, the sequence ends. The fourth column shows timing requirements to be applied to a command or a reply.

FIGS. 3A and 3B—resp. 4A-5B—relates to Tag 1—resp. Tag 2, 3. For each table, first column shows the state of the Tag, second column shows the value in the slot counter of the Tag, third column shows the RN16 or the handle (in hexadecimal) generated by the random number generator or pseudo-random number generator of the Tag, fourth column shows the session used by the Tag to communicate with Reader E, and last column shows the inventoried flag value associated with said session.

In a step 1, Reader E generates an RF field. As a result, Tags 1, 2 and 3, which are in the read-zone for Reader E, enter the Ready state. At this stage, for each of these Tags, the slot counter does not contain any value, no RN16 or handle has been generated yet, the session to be used with Reader E has not been defined yet, and the inventoried flag value is not applicable since the session is undefined.

In a step 2, Reader E issues a Select command, said command comprising a session number Sx and an inventoried flag value IFVx. In the described example, the session number Sx is S2 and the inventoried flag value IFVx is A. As a result, Tags 1, 2 and 3 set their inventoried flag value for session S2 to A.

In a step 3, Reader E issues a Query command, said command comprising a session number Sx, an inventoried flag value IFVx, and a slot-count parameter Q in the range (0, 15). In the described example, the session number Sx is S2, the inventoried flag value IFVx is A, and the slot-count parameter Q is 8. As a result, Tag 1, 2 and 3 enter the Arbitrate state, and generate a Q-bit number and a 16-bit number (RN16) using their random number generator or pseudo-random number generator. In the described example, the Q-bit number and the RN16 generated by Tag 1 are 1 and 1111; the Q-bit number and the RN16 generated by Tag 2 are 2 and 2222; and the Q-bit number and the RN16 generated by Tag 3 are 3 and 3333. The communication slot is set to zero.

In a step 4, Reader E waits for time T1 and does not receive any reply, since none of Tags 1, 2 or 3 has zero as a value in their slot counter.

In a step 5, Reader E issues a QueryRep command, said command comprising the session number of the previous Query command, that is to say S2. As a result, Tags 1, 2 and 3, whose slot counters hold nonzero values, decrement their slot counter. Moreover, since the value in Tag 1's slot counter turns zero, Tag 1 transitions to the Reply state. The communication slot is increased to one.

In a step 6, Tag 1 backscatters its RN16, said RN16 being received by Reader E.

In a step 7, Reader E acknowledges Tag 1 by echoing its RN16 within an ACK command. As a result, Tag 1 transitions to the Acknowledged state.

In a step 8, Tag 1 sends its EPC code, said EPC code being received by Reader E.

In a step 9, Reader E sends a Req_RN command comprising Tag 1's RN16, which makes Tag 1 transition to the Open or Secured state, depending on Tag 1's access password.

In a step 10, Tag 1 generates, stores and backscatters a new 16-bit random or pseudo-random number, the handle, said handle being received by Reader E. In the described example, the handle generated by Tag 1 is 6666.

In a step 11, Reader E sends an Authenticate command comprising Tag 1's handle. As a result, Tag 1 transitions to the Open state.

In a step 12, Tag 1 backscatters a crypto response, said crypto response being received by Reader E.

In a step 13, Reader E issues a QueryRep command so as to identify other Tags. Said command comprises the session number of the previous Query command, that is to say S2. As a result, Tag 1 inverts its inventoried flag (A→B) and transitions to the Ready state. Besides that, all Tags with inventoried flag value A for session S2 and whose slot counter holds a nonzero value, that is to say Tags 2 and 3, decrement their slot counter. Since the value in Tag 2's slot counter turns zero, Tag 2 transitions to the Reply state. The communication slot is increased to two.

In a step 14, Tag 2 backscatters its RN16, said RN16 being received by Reader E.

In a step 15, Reader E acknowledges Tag 2 by echoing its RN16 within an ACK command. As a result, Tag 2 transitions to the Acknowledged state.

In a step 16, Tag 2 sends its EPC code, said EPC code being received by Reader E.

In a step 17, Reader E sends a Req_RN command comprising Tag 2's RN16, which makes Tag 2 transition to the Open or Secured state, depending on Tag 2's access password.

In a step 18, Tag 2 generates, stores and backscatters a new 16-bit random or pseudo-random number, the handle, said handle being received by Reader E. In the described example, the handle generated by Tag 2 is 7777.

In a step 19, Reader E sends an Authenticate command comprising Tag 2's handle. As a result, Tag 2 transitions to the Open state.

In a step 20, Tag 2 backscatters a crypto response, said crypto response being received by Reader E.

In a step 21, Reader E issues a QueryRep command so as to identify other Tags. Said command comprises the session number of the previous Query command, that is to say S2. As a result, Tag 2 inverts its inventoried flag (A→B) and transitions to the Ready state. Besides that, all Tags with inventoried flag value A for session S2 and whose slot counter holds a nonzero value, that is to say Tag 3 only, decrement their slot counter. Since the value in Tag 3's slot counter turns zero, Tag 3 transitions to the Reply state. The communication slot is increased to three.

In a step 22, Tag 3 backscatters its RN16, said RN16 being received by Reader E.

In a step 23, Reader E acknowledges Tag 3 by echoing its RN16 within an ACK command. As a result, Tag 3 transitions to the Acknowledged state.

In a step 24, Tag 3 sends its EPC code, said EPC code being received by Reader E.

In a step 25, Reader E sends a Req_RN command comprising Tag 3's RN16, which makes Tag 3 transition to the Open or Secured state, depending on Tag 3's access password.

In a step 26, Tag 3 generates, stores and backscatters a new 16-bit random or pseudo-random number, the handle, said handle being received by Reader E. In the described example, the handle generated by Tag 3 is 8888.

In a step 27, Reader E sends an Authenticate command comprising Tag 3's handle. As a result, Tag 3 transitions to the Open state.

In a step 28, Tag 3 backscatters a crypto response, said crypto response being received by Reader E.

In a step 29, Reader E issues a QueryRep command so as to identify other Tags. Said command comprises the session number of the previous Query command, that is to say S2. As a result, Tag 3 inverts its inventoried flag (A→B) and transitions to the Ready state. Nothing else happens since there are no more tags in Reader E's read zone that have A as an inventoried flag value for session S2. The communication slot is increased to four.

In a step 30, Reader E waits for time T1 and does not receive any reply to the previous QueryRep command.

In a step 31, Reader E issues another QueryRep comprising the session number of the previous Query command, that is to say S2. Nothing happens since there are no more tags in Reader E's read zone that have A as an inventoried flag value for session S2. The communication slot is increased to five.

In a step 32, Reader E waits for time T1 and does not receive any reply to the previous QueryRep command.

In a step 33, Reader E issues another QueryRep comprising the session number of the previous Query command, that is to say S2. Nothing happens since there are no more tags in Reader E's read zone that have A as an inventoried flag value for session S2. The communication slot is increased to six.

In a step 34, Reader E waits for time T1 and does not receive any reply to the previous QueryRep command.

In a step 35, Reader E issues another QueryRep comprising the session number of the previous Query command, that is to say S2. Nothing happens since there are no more tags in Reader E's read zone that have A as an inventoried flag value for session S2. The communication slot is increased to seven.

In a step 36, Reader E waits for time T1 and does not receive any reply to the previous QueryRep command. Since the slot-count parameter is 8 and the communication slot has reached 7, the inventory round is ended after this last unsuccessful attempt to identify other Tags.

As already explained, all ACK commands issued by a Reader End intended for a tag shall include a 16-bit random number previously generated and backscattered by the tag, said number being either the RN16 or the handle. If a reader issues an ACK command to a tag in the Reply or Acknowledged state, then the echoed number shall be the RN16 that the tag previously backscattered as it transitioned from the Arbitrate state to the Reply state. If the reader issues an ACK command to a tag in the Open or Secured state, then the echoed number shall be the tag's handle. For reasons of convenience, the echoed 16-bit random number (either the RN16 or the handle) included in an ACK command is referred to as 'session handle'. As a consequence, 'session handle' may refer indifferently to a tag's RN16 or handle. Upon receiving an ACK command, a tag shall verify that the session handle is correct prior to executing said command.

Receiving an ACK command with an incorrect session handle may happen in a RFID system having multiple RFID readers operating in parallel, because some tags might be simultaneously within the effective read zone for more than one reader, whether this is intentional or not. For instance, in the example illustrated in FIG. 1, Tag 3 is in the effective read zone for both Readers A and B. Thus, Tag 3 may hear an ACK command issued by Reader G while being in communication with Reader E. Said ACK command may for instance be intended for Tag 4. The probability of two readers simultaneously communicating with two tags which have the same session handle being 1 in $2^{16}$, the session handle included in said ACK command is likely to be different from Tag 3's session handle.

A tag hearing an ACK command with an incorrect session handle shall not execute said command. Furthermore, as already mentioned, if said tag state is Open or Secured, then the tag shall transition to the Arbitrate state. This is problematic because a transition to the Arbitrate state essentially terminates communication between the tag and the reader with which the tag was communicating. In the previous-mentioned example, if Tag 3 is in the Open or the Secured state and hears Reader G sending an ACK command intended to Tag 4, said ACK command comprising Tag 4's session handle, then Tag 3 shall transition to the Arbitrate state, thereby losing connection with Reader E.

If a tag terminates communication with a reader, there is usually the possibility to identify and access said tag at a later time. However, this is not always the case when the tag is moving rapidly through read zones.

Furthermore, the possibility to use two or more inventoried flags could induce mistakes if a tag having a wrong inventoried flag, answers to the reader during a session or if a tag changes his state while he should keep the same state. The multiplicity of inventoried flags is not safe enough, in particular if a Reader sends wrong inventoried flags to one or several Tags.

SUMMARY OF THE INVENTION

It is an object of the invention to provide an asymmetric identification and access method, compatible with the Gen2V2 protocol, wherein interferences between various inventoried flags during the same session are avoided. It is another object of the invention to provide an asymmetric identification and access method wherein cases of communication loss due to receiving an ACK command with an incorrect session handle are avoided.

Thus, the invention concerns a method for providing asymmetric identification and access with respect to a passive radio-frequency tag in a tag population, the passive tag being configured for receiving commands, among which commands for acknowledging a tag, referred to as ACK, an ACK command comprising an identification parameter in the form of a 16-bit number, the tag having:
- a slot counter holding a value determining the point in an inventory round at which the tag may respond
- a random number generator or pseudo-random number generator, arranged to generate a 16-bit value when the tag starts participating in an inventory round, and arranged to generate another 16-bit value when the reader starts accessing the tag
- a state that characterizes the tag's behavior and response to reader's commands, said state being part of a state list comprising:
    Ready, which is a holding state for a tag not currently participating in an inventory round
    Arbitrate, which is holding state for a tag currently participating in an inventory round and whose slot counter holds a nonzero value
    Open or Secured, which are states a tag transitions to when a reader starts accessing it.

According to the invention, the method comprises the following steps, performed by the tag initially in the Ready state:
- receiving a command for initiating an inventory round, referred to as inventory initiating command, said inventory initiating command comprising, as a parameter, a reader identifier in the form of a N-bit number, N being an integer in the range (1, 15)
- generating, by means of the random number generator or pseudo-random number generator, a 16-bit value referred to as first binding handle, said first binding handle comprising N juxtaposed bits forming the reader identifier
- backscattering the first binding handle, said first binding handle being received by the reader
- receiving a command for initiating a tag access, referred to as access initiating command, said access initiating command having the first binding handle as a parameter
- generating, by means of the random number generator or pseudo-random number generator, a 16-bit value referred to as second binding handle, said second binding handle comprising N juxtaposed bits forming the reader identifier, said reader identifier being located within the second binding handle at a location similar to the location of the reader identifier within the first binding handle
- backscattering the second binding handle, said second binding handle being received by the reader
- transitioning to the Open or Secured state
- receiving an ACK command
- comparing the reader identifier with a code formed by N bits of the identification parameter of said ACK command that are positioned at a location similar to the location of the reader identifier within the first or second binding handle, and in a case where said code and said reader identifier differ, then ignoring said ACK command, the tag having an inventoried flag for each session a reader may use to identify the tag within an inventory round, said inventoried flag having a value indicating whether the tag may respond to the reader, the inventoried flag comprising at least two possible values, A or B for example, the first initiating command including a session number as a parameter, and one selected inventoried flag value of the at least two possible values, the method comprising the following step, performed after receiving the inventory initiating command: setting the inventoried flag to the selected value for the session specified in the inventory initiating command.

According to the invention, only tags having the selected inventoried flag value for the session number are inventoried, the first initiating command only including the same inventoried flag for every inventoried tags during a session, and the at least other inventoried flag value is never used by the reader during said session.

The invention offers a new command, called inventory initiating command, which may be integrated within the Gen2v2 protocol. Preferentially, the inventory initiating command provides similar functionality to the command sequence Select/Query as defined in the Gen2V2 protocol. The inventory initiating command enables the reader to start an inventory round, and instructs the tag to participate in said inventory round. Upon receiving the inventory initiating command, the tag shall generate a first binding handle, as it would have generated a RN16 if it had been in response to a Query, QueryAjust or QueryRep command. However, the first binding handle differs from a classic RN16 in that it is not completely a random number: a portion of the first binding handle is made of the reader identifier included in the inventory initiating command. The identifier for the reader may be a unique value that is different from the values for all other readers, or at least for readers that have some portion of their reading zone in common. Then, the tag shall backscatter the first binding handle, as it would have done with a classic RN16. Subsequently, the first binding handle is received by the reader, and said first binding handle may be used to identify and acknowledge the tag by using an ACK command whose identification parameter is the first binding handle.

Then, at some point, the reader sends the access initiating command, namely a Req_RN command as defined in the Gen2V2 protocol, so as to initiate an Access operation with the tag. As defined by the Gen2V2, the Req_RN shall comprise the 16-bit value previously backscattered by the tag, which is, in this case, the first binding handle. Upon receiving the access initiating command comprising the first binding handle, the tag shall generate a second binding handle. The second binding handle differs from a classic handle in that it is not completely a random number: a portion of the second binding handle is made of the reader identifier included in the inventory initiating command. Then, the tag shall backscatter the second binding handle, as it would have done with a classic handle, and transition to the Open or Secured state. Subsequently, the second binding handle is received by the Reader End the Access operation may go on.

From this point and as long as the tag is in the Open or Secured state, if the reader issues an ACK command intended for the tag, said ACK command shall have the second binding handle as an identification parameter. According to the Gen2V2 protocol, a tag in the Open or Secured state shall transition to the Arbitrate state upon receiving an ACK command whose identification parameter is different from the tag's handle. According to the invention, a tag which has received a inventory initiating command earlier in the identification and access sequence and is now in the Open or Secured state, shall, upon receiving an ACK command, determine whether or not the identification parameter of said ACK command comprises the reader identifier of the first identification command. If not, it means that the ACK command has been issued by another reader. Then the tag simply ignores the ACK command and does not transition to the Arbitrate state. It should be noted that if this other reader uses the method according to the invention as well to identify and access another tag, then the identification parameter in the ACK command comprises the other reader's identifier. Otherwise, the identification parameter in the ACK command is a complete random number.

In addition, by using only one inventoried flag during the same session, interferences between tags are avoided. Indeed, the reader is only able to inventory and send commands to tags with always the same inventoried flag, so that a wrong inventoried flag can't be received by a tag that would induces mistakes in the tag behavior. The word "assymetric" means that an inventory or a command sent by the reader is only possible with one inventoried flag, even if tags have another selectable inventoried flag. The reader is configured to use only one inventoried flag in a single session. Preferably, the reader uses the same inventoried flag during every sessions.

On the contrary, the Gen2v2 protocol allows the reader to use both inventoried flags A and B in the same session. Thus, the reader inventories a first group of tags having the inventoried flags A, and another group of tags having the inventoried flag B, for example. This configuration is named "symmetric" as a reader is able to order independently the same command to the first group of tags, and to the second group of tags in an independent manner. Of course, this protocol is not safe enough to avoid mistakes due to interferences between inventoried flags A and B.

Furthermore, the method according to the invention may comprise one or a combination of the following characteristics.

In an embodiment, in a case where said code and said reader identifier match, then the method comprises a step of comparing the other bits of the parameter with the other bits of the second binding handle, and in a case where said bits match, then the method comprises a step of responding to the ACK command.

In an embodiment, the state list comprises Reply, which is a state a tag currently participating in an inventory round transitions to when the value in its slot counter becomes zero, the random number generator or pseudo-random number generator is arranged to generate a Q-bit value when the tag starts participating in an inventory round, Q being an integer in the range (0, 15), the inventory initiating command comprises Q as a parameter, said parameter being referred to as slot-count parameter, and the method comprises the following step, performed after receiving the inventory initiating command:

generating, by means of the random number generator or pseudo-random number generator, a Q-bit value and loading it into the slot counter transitioning to the Arbitrate state if said Q-bit value is nonzero, or to the Reply state otherwise.

It should be noted that including the Q-bit value in the first and second binding handles provides additional confidence to the reader that a tag response is for the correct reader.

In an embodiment, the first binding handle and the second binding handle comprise Q juxtaposed bits different from the N juxtaposed bits, said Q juxtaposed bits forming the Q-bit value, the Q-bit value being positioned within the first binding handle at a location similar to the location of the Q-bit value within the second binding handle.

In an embodiment, Q is in the range 0 to 5.

In an embodiment, the 16-N-Q bits left in the first and second binding handles are generated randomly by the random number generator or pseudo-random number generator.

In an embodiment, the selected inventoried flag is always A for each session.

In an embodiment, the reader identifier is a 5-bit number, that is to say N=5.

BRIEF DESCRIPTION OF THE DRAWINGS

The present invention will be described subsequently with reference to the attached drawings, given by way of example, but in no way limited thereto, in which:

FIGS. 2A and 2B, already mentioned, illustrates an inventory and access sequence between Reader E and Tags 1, 2 and 3;

FIGS. 3A, 3B, 4A, 4B, 5A, and 5B illustrate some features of Tags 1, 2 and 3 along the communication sequence of FIG. 2;

FIGS. 6A, 6B, and 6C illustrate an inventory and access sequence between Reader E and Tags 1, 2 and 3, according to an embodiment of the present invention;

FIGS. 7A, 7B, 8A, 8B, 9A, and 9B illustrate some features of Tags 1, 2 and 3 along the communication sequence of FIGS. 6A-6C.

DETAILED DESCRIPTION OF THE INVENTION

Figure 1:
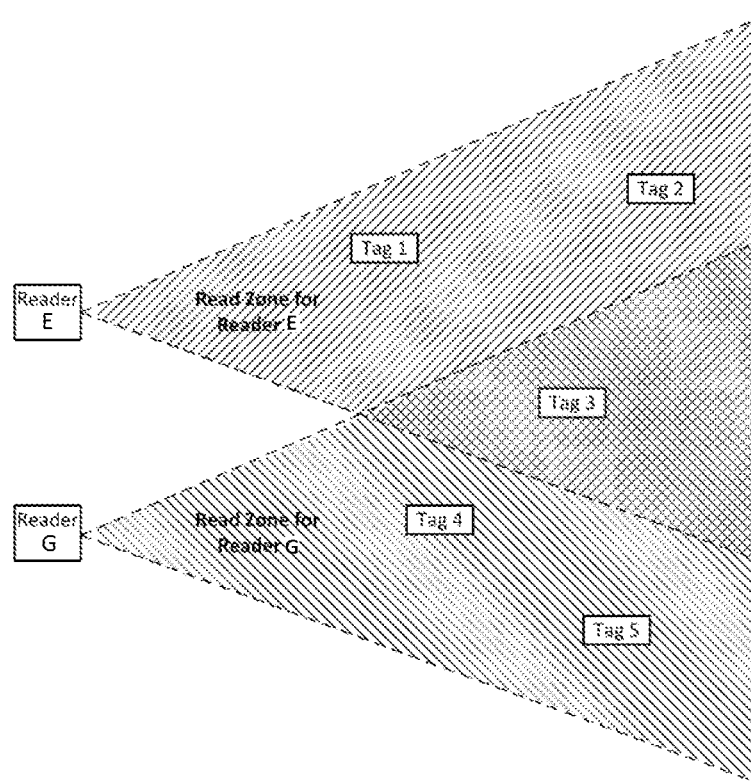
FIG. 1, already mentioned, is a schematic representation of a RFID system comprising two readers, Reader E and Reader G, and a Tag population comprising five Tags 1, 2, 3, 4, 5, wherein Tag 3 is in the effective read zone for both Readers A and Reader G.

The method according to the invention is supposed to be carried out by a radio-frequency passive tag. Said tag comprises means to carry out the Gen2V2 protocol, so it has, as it has been explained before in more details:
- a memory in which an EPC code and an access password are stored
- four inventoried flags, one for each session S1, S2, S3, S4 the reader may use to identify the tag within an inventory round. Each inventoried flag has either value A or value B, said value indicating whether the tag may respond to the reader.
- a slot counter holding a value determining the point, in an inventory round initiated by the reader, at which the tag may respond.
- a random number generator or pseudo-random number generator, arranged to generate:
  - a 16-bit value referred to as RN16, when it starts participating in an inventory round, that is to say in response to a Query, QueryRep or QueryAdjust command with appropriate parameters
  - a Q-bit value, Q being an integer in the range (0, 15), when it starts participating in an inventory round, that is to say in response to a Query, QueryRep or QueryAdjust with appropriate parameters
  - a 16-bit value referred to as handle, when it starts participating in an access operation, that is to say in response to a Req_RN command having the RN16 as a parameter.

As defined in the Gen2V2 protocol, the tag's behavior and response to a reader's command is defined by its state, which are, among others:
- Ready, which is a holding state for a tag not currently participating in an inventory round
- Arbitrate, which is holding state for a tag participating in an inventory round and whose slot counter holds a nonzero value
- Reply, which is a state a tag in the Arbitrate state transitions to when the value in its slot counter reaches zero
- Acknowledged, which is a state a tag in the Reply state transitions to when it receives an ACK command whose identification parameter is identical to its RN16
- Open or Secured, which are states a tag in the Acknowledged state transitions to when it receives an Req_RN command whose parameter is identical to its RN16.

According to the invention, an additional command is added to the set of commands defined in the Gen2V2 protocol. This command, referred to as inventory initiating command, provides similar functionality to the command sequence Select/Query. The inventory initiating command has the following parameters:
- a session number Sx (S1, S2, S3 or S4)
- only one inventoried flag value IFVx for a single session (preferably A), so that only tags having the selected inventoried flag value for the session number are inventoried, the other inventoried flag (B) value is never used during the session
- a slot-count parameter Q, Q being an integer in the range (0, 15)
- an identifier RD of the reader that issues the inventory initiating command, in the form of a N-bit value, N being an integer in the range (1, 15).

Upon receipt of an inventory initiating command while in the Ready state, the tag shall:
- set its inventoried flag (A) for the session Sx instructed in the inventory initiating command, to the value IFVx specified in the inventory initiating command,
- generate, by means of the random number generator or pseudo-random number generator, a Q-bit value and loading it into the slot counter
- transition to the Arbitrate state if said Q-bit value is nonzero, or to the Reply state otherwise
- generate, by means of the random number generator or pseudo-random number generator, a 16-bit value referred to as first binding handle, said first binding handle comprising N juxtaposed bits forming the reader identifier RD specified in the inventory initiating command, Q juxtaposed bits forming the Q-bit value, and 16-N-Q random bits. Preferably, N=5 and Q is in the range 0 to 5. In the described embodiment, the binding handle has the following structure: the 4 most significant bits represent the reader identifier, the 4 least significant bits represent the Q-bit value, and the 8 middle bits are a random value. In another embodiment, the first binding handle comprises N juxtaposed bits, preferably 4 or 5, forming the reader identifier RD specified in the inventory initiating command, and 16-N random bits. In this other embodiment, the binding handle has preferably the following structure: the 4 or 5 most significant bits represent the reader identifier, and the 12 or 11 least important bits are a random value.
- backscatter the first binding handle.

A tag that has previously received a first initial command within a same inventory and access sequence shall, upon receipt of a Req_RN command while in the Acknowledged state, in a case where said Req_RN has the tag's first binding handle as a parameter:
- transition to the Open or Secured state, the choice of ending state depending on the Tag's access password (in the access password is zero, then the tag shall transition to the Secured state; if the access password is nonzero, then the tag shall transition to the Open state)
- generate, by means of the random number generator or pseudo-random number generator, a 16-bit value referred to as second binding handle, said second binding handle having the same structure as the first binding handle: for instance the 4 most significant bits represent the reader identifier, the 4 least significant bits represent the Q-bit value, and the 8 middle bits are a random value.
- backscatter the second binding handle.

By way of example only, FIGS. 6A-6C illustrate an inventory and access sequence between Reader E and Tags 1, 2 and 3, implementing the inventory initiating command. First column relates to Reader E, and shows in particular commands Reader E issues, and responses Reader E receives during the sequence. Last column relates to the Tags, and in particular shows actions performed by a Tag in response to a command from Reader E. The middle column shows messages directions: an arrow pointing right indicates a command from Reader E to at least a Tag; an arrow pointing left indicates a response from at least a tag to Reader E. The second column shows the communication slot, which starts from zero and is incremented by one every time Reader E issues a QueryRep command subsequently to a inventory initiating command. When the communication slot reaches Q−1, the sequence ends. The fourth column shows timing requirements to be applied to a command or a reply.

FIGS. 7A and 7B—resp. 8A-9B—relates to Tag 1—resp. Tag 2, 3. For each table, first column shows the state of the Tag, second column shows the value in the slot counter of the Tag, third column shows a first or a second binding handle (in hexadecimal) generated by the random number generator or pseudo-random number generator of the Tag at some points of the sequence, fourth column shows the session used by the Tag to communicate with Reader E, and last column shows the inventoried flag value associated with said session.

In a step 1, Reader E generates an RF field. As a result, Tags 1, 2 and 3, which are in the read zone for Reader E, enter the Ready state. At this stage, for each of these Tags, the slot counter does not contain any value, no first or second binding handle has been generated yet, the session to be used with Reader E has not been defined yet, and the inventoried flag value is not applicable since the session is undefined.

In a step 2, Reader E issues a first initiation command having as parameters:
 the session number S2
 the only one inventoried flag value (preferably A)
 8 as a slot-count parameter Q
 the reader identifier C (in hexadecimal, that is to say 1100 in the binary system).

As a result, Tags 1, 2 and 3 set their inventoried flag value for session S2 to A. In addition, Tags 1, 2 and 3 generate a 8-bit number and a 16-bit number (first binding handle) using their random number generator or pseudo-random number generator. In the described embodiment, the binding handles have the following structure: the 4 most significant bits represent the reader identifier, the 4 least significant bits represent the Q-bit value, and the 8 middle bits are a random value. In the illustrated example, the 8-bit number and the first binding handle generated by Tag 1 are 1 and C661; the 8-bit number and the first binding handle generated by Tag 2 are 2 and C772; and the 8-bit number and the first binding handle generated by Tag 3 are 3 and C883. Moreover, Tag 1, 2 and 3 enter the Arbitrate state. Besides that, the communication slot is set to zero.

In a step 3, Reader E waits for time T1 and does not receive any reply, since none of Tags 1, 2 or 3 has zero as a value in their slot counter.

In a step 4, Reader E issues a QueryRep command, said command comprising the session number of the previous Query command, that is to say S2. As a result, Tags 1, 2 and 3, whose slot counters hold nonzero values, decrement their slot counter. Moreover, since the value in Tag 1's slot counter turns zero, Tag 1 transitions to the Reply state. The communication slot is increased to one.

In a step 5, Tag 1 backscatters its first binding handle, said first binding handle being received by Reader E.

In a step 6, Reader E acknowledges Tag 1 by echoing the first binding handle within an ACK command. As a result, Tag 1 transitions to the Acknowledged state.

In a step 7, Tag 1 sends its EPC code, said EPC code being received by Reader E.

In a step 8, Reader E sends a Req_RN command comprising Tag 1's first binding handle, which makes Tag 1 transition to the Open or Secured state, depending on Tag 1's access password.

In a step 9, Tag 1 generates, stores and backscatters a new 16-bit random or pseudo-random number, the second binding handle, said second binding handle being received by Reader E. In the described example, the second binding handle generated by Tag 1 is CDD1.

In a step 10, Reader E sends an Authenticate command comprising Tag 1's second binding handle. As a result, Tag 1 transitions to the Open state.

In a step 11, Tag 1 backscatters a Crypto response, said Crypto response being received by Reader E.

In a step 12, Reader E issues a QueryRep command so as to identify other Tags. Said command comprises the session number of the previous Query command, that is to say S2. As a result, Tag 1 inverts its inventoried flag (A→B) and transitions to the Ready state. Besides that, the other Tags having the inventoried flag value A for session S2 and whose slot counter holds a nonzero value, that is to say Tags 2 and 3, decrement their slot counter. Since the value in Tag 2's slot counter turns zero, Tag 2 transitions to the Reply state. The communication slot is increased to two.

In a step 13, Tag 2 backscatters its first binding handle, said first binding handle being received by Reader E.

In a step 14, Reader E acknowledges Tag 2 by echoing the first binding handle within an ACK command. As a result, Tag 2 transitions to the Acknowledged state.

In a step 15, Tag 2 sends its EPC code, said EPC code being received by Reader E.

In a step 16, Reader E sends a Req_RN command comprising Tag 2's first binding handle, which makes Tag 2 transition to the Open or Secured state, depending on Tag 2's access password.

In a step 17, Tag 2 generates, stores and backscatters a new 16-bit random or pseudo-random number, the second binding handle, said second binding handle being received by Reader E. In the described example, the second binding handle generated by Tag 2 is CEE2.

In a step 18, Reader E sends an Authenticate command comprising Tag 2's second binding handle. As a result, Tag 2 transitions to the Open state.

In a step 19, Tag 2 backscatters a crypto response, said crypto response being received by Reader E.

In a step 20, Reader E issues a QueryRep command so as to identify other Tags. Said command comprises the session number of the previous Query command, that is to say S2. As a result, Tag 2 inverts its inventoried flag (A→B) and transitions to the Ready state. Besides that, all Tags with inventoried flag value A for session S2 and whose slot counter holds a nonzero value, that is to say Tag 3 only, decrement their slot counter. Since the value in Tag 3's slot counter turns zero, Tag 3 transitions to the Reply state. The communication slot is increased to three.

In a step 21, Tag 3 backscatters its first binding handle, said first binding handle being received by Reader E.

In a step 22, Reader E acknowledges Tag 3 by echoing its first binding handle within an ACK command. As a result, Tag 3 transitions to the Acknowledged state.

In a step 23, Tag 3 sends its EPC code, said EPC code being received by Reader E.

In a step 24, Reader E sends a Req_RN command comprising Tag 3's first binding handle, which makes Tag 3 transition to the Open or Secured state, depending on Tag 3's access password.

In a step 25, Tag 3 generates, stores and backscatters a new 16-bit random or pseudo-random number, the second binding handle, said second binding handle being received by Reader E. In the described example, the handle generated by Tag 3 is CFF3.

In a step 26, Reader E sends an Authenticate command comprising Tag 3's handle. As a result, Tag 3 transitions to the Open state.

In a step 27, Tag 3 backscatters a Crypto response, said Crypto response being received by Reader E.

In a step 28, Reader E issues a QueryRep command so as to identify other Tags. Said command comprises the session number of the previous Query command, that is to say S2. As a result, Tag 3 inverts its inventoried flag (A→B) and transitions to the Ready state. Nothing else happens since there are no more tags in Reader E's read zone that have A as an inventoried flag value for session S2. The communication slot is increased to four.

In a step 29, Reader E waits for time T1 and does not receive any reply to the previous QueryRep command.

In a step 30, Reader E issues another QueryRep comprising the session number of the previous Query command, that is to say S2. Nothing happens since there are no more tags in Reader E's read zone that have A as an inventoried flag value for session S2. The communication slot is increased to five.

In a step 31, Reader E waits for time T1 and does not receive any reply to the previous QueryRep command.

In a step 32, Reader E issues another QueryRep comprising the session number of the previous Query command, that is to say S2. Nothing happens since there are no more tags in Reader E's read zone that have A as an inventoried flag value for session S2. The communication slot is increased to six.

In a step 33, Reader E waits for time T1 and does not receive any reply to the previous QueryRep command.

In a step 34, Reader E issues another QueryRep comprising the session number of the previous Query command, that is to say S2. Nothing happens since there are no more tags in Reader E's read zone that have A as an inventoried flag value for session S2. The communication slot is increased to seven.

In a step 35, Reader E waits for time T1 and does not receive any reply to the previous QueryRep command. Since the slot-count parameter is 8 and the communication slot has reached 7, the inventory round is ended after this last unsuccessful attempt to identify other Tags.

As already mentioned, Tag 3 is in the read zone for both Reader E and Reader G, which implies that Tag 3 may receive, at any time of an identification and access sequence according to the invention, an ACK command issued by Reader G and intended for another tag, let us say Tag 4. Thus, according to the invention, Tag 3 analyzes the bits of the identification parameter of the ACK command where Tag 3's identifier is supposed to be positioned (in the preferred embodiment, the 4 most significant bits of said identification parameter), so as to determine which reader has issued said command. Of course, Reader G may use with Tag 4 an identification and access sequence according to the invention (that is to say a sequence comprising a inventory initiating command), or a classic inventory and access sequence according to the Gen2V2 protocol (that is to say a sequence comprising a Select and a Query command). In the first case, the identification parameter included in the ACK command is Tag 4's first or second binding handle, said first or second binding handle comprising Tag 4's identifier. Thus, the bits of the identification parameter of the ACK command where Tag 3's identifier is supposed to be positioned form Tag 4's identifier instead, and Tag 3 concludes the ACK command is invalid. In the second case, the identification parameter included in the ACK command is a 16-bit random number, either Tag 4's RN16 or Tag 4's handle. Thus, the bits of the identification parameter of the ACK command where Tag 3's identifier is supposed to be do not form any reader identifier and Tag 3 concludes the ACK command is invalid.

When Tag 3, performing with Reader E an identification and access sequence according to the invention, receives an ACK command issued by Reader G:
- if Tag 3's state is not Open or Secured, then Tag 3 ignores ACK command from Reader G (as defined by the Gen2V2 protocol)
- if Tag 3's state is Open or Secured, the identification parameter do have the correct reader identifier, but the identification parameter differs from Tag 3's second binding handle, then Tag 3 will transition to Arbitrate and stop communication with Reader E (as defined by the Gen2V2 protocol)
- if Tag 3's state is Open or Secured, the identification parameter do have the correct reader identifier, and the identification parameter is equal to Tag 3's second binding handle, then Tag 3 responds to the ACK command and may no longer be in sync with Reader E (as defined by the Gen2V2 protocol)
- but if Tag 3's state is Open or Secured and if the identification parameter do not have the correct reader identifier, then Tag 3 ignores ACK command from Reader G, which was on other objective of the present invention.

It should be noted that Tag 3 may receive other kinds of commands from Reader G:
- if Tag 3 receives an inventory initiation command from Reader G, Tag 3 shall switch from Reader E to Reader G and may be subsequently inventoried and accessed by Reader G
- if Tag 3 receives a Req_RN command from Reader G, then if Tag 3's state is Ready, Arbitrate, or Reply, or if the 16-bit number comprised in said command does not match the expected value, then Tag 3 shall ignore the Req_RN command. Otherwise, if the 16-bit value matches the expected value (which is highly unlikely, though), then Tag3 shall respond to the Req_RN and may no longer be in sync with Reader E.
- if Tag 3 receives an Authenticate command from Reader G, then if Tag 3's state is Ready, Arbitrate, Reply or Acknowledged, or if the 16-bit value comprised in said command does not match the expected binding handle value, then Tag 3 shall ignore said command. Otherwise, if the 16-bit value matches the expected value (which is highly unlikely), then Tag 3 shall respond to the Authenticate command and may no longer be in sync with Reader E.
- if Tag 3 receives a Select command from Reader G, Tag 3 shall switch from Reader E to Reader G and may be subsequently inventoried and accessed by Reader G
- if Tag 3 receives a Query command from Reader G, Tag 3 shall switch from Reader E to Reader G and may be subsequently inventoried and accessed by Reader G.
- if Tag 3 receives a QueryRep or a QueryAdjust command from Reader G, Tag 3 shall ignore said command as Tag 3's session is different from the session that is mentioned in said command.

Although the exemplary embodiments have been described in detail with particular reference to certain aspects thereof, it should be understood that the invention is capable of other embodiments and its details are capable of modifications in various obvious respects. As is readily apparent to those skilled in the art, variations and modifications can be effected while remaining within spirit and scope of the invention. Accordingly, the foregoing disclosure, description, and FIGURES are for illustrative purposes only and do not in any way limit the invention, which is defined by the claims.

The invention claimed is:

1. A method for providing asymmetric identification and access with respect to a passive radio-frequency tag in a tag population, the passive tag being configured to receive commands, including commands for acknowledging a tag, an ACK command comprising an identification parameter being a 16-bit number, the tag having:
 a slot counter holding a value determining a point in an inventory round at which the tag may respond to a reader,
 a random number generator or a pseudo-random number generator, configured to generate a 16-bit value when the tag starts participating in the inventory round, and configured to generate another 16-bit value when the reader starts accessing the tag,
 a state that characterizes a behavior of the tag and a response to the commands of the reader, said state being part of a state list including Ready, which is a holding state for a tag not currently participating in the inventory round, Arbitrate, which is holding state for a tag currently participating in the inventory round and whose slot counter holds a nonzero value, and Open or secured, which are states a tag transitions to when a reader starts accessing the tag, said method comprising the following steps, performed by the tag initially in the Ready state:
 receiving an inventory initiating command to initiate the inventory round, said inventory initiating command comprising, as a parameter, a reader identifier being a N-bit number, N being an integer in a range (1, 15),
 generating, with the random number generator or the pseudo-random number generator, a 16-bit value being a first binding handle, said first binding handle comprising N juxtaposed bits forming the reader identifier,
 backscattering the first binding handle, said first binding handle being received by the reader,
 receiving an access initiating command to initiate a tag access, said access initiating command having the first binding handle as a parameter,
 generating, with the random number generator or the pseudo-random number generator, a 16-bit value being a second binding handle, said second binding handle comprising N juxtaposed bits forming the reader identifier, said reader identifier being located within the second binding handle at a location similar to a location of the reader identifier within the first binding handle,
 backscattering the second binding handle, said second binding handle being received by the reader,
 transitioning to the Open or Secured state,
 receiving an ACK command,
 comparing the reader identifier with a code formed by N bits of the identification parameter of said ACK command that are positioned at a location similar to the location of the reader identifier within the first or second binding handle, and when said code and said reader identifier differ, ignoring said ACK command,
 the tag having an inventoried flag for each session a reader may use to identify the tag within the inventory round, said inventoried flag having a value indicating whether the tag may respond to the reader, the inventoried flag comprising at least two possible values, A or B, the first initiating command including a session number as a parameter, and one selected inventoried flag value of the at least two possible values, the method further comprising the following step, performed after receiving the inventory initiating command: setting the inventoried flag to the selected value for the session specified in the inventory initiating command,
 wherein only tags having the selected inventoried flag value for the session number are inventoried, the first initiating command only including a same inventoried flag for every inventoried tag during a session, and wherein the at least one other inventoried flag value is never used during the session.

2. The method according to claim 1, wherein when said code and said reader identifier match, comparing other bits of the parameter with other bits of the second binding handle, and when said bits match, responding to the ACK command.

3. The method according to claim 1, wherein the state list comprises Reply, which is a state a tag currently participating in the inventory round transitions to when the value in its slot counter becomes zero, the random number generator or pseudo-random number generator being arranged to generate a Q-bit value when the tag starts participating in the inventory round, Q being an integer in the range, the inventory initiating command comprising Q as a slot-count parameter, the method further comprising the following step, performed after receiving the inventory initiating command:
 generating, with the random number generator or the pseudo-random number generator, a Q-bit value and loading the Q-bit value into the slot counter, and transitioning to the Arbitrate state if said Q-bit value is nonzero, or to the Reply state otherwise.

4. The method according to claim 3, wherein the first binding handle and the second binding handle comprise Q juxtaposed bits different from the N juxtaposed bits, said Q juxtaposed bits forming the Q-bit value, the Q-bit value being positioned within the first binding handle at a location similar to a location of the Q-bit value within the second binding handle.

5. The method according to claim 3, wherein Q is in a range 0 to 5.

6. The method according to claim 4, wherein 16-N-Q bits left in the first and second binding handles are generated randomly by the random number generator or the pseudo-random number generator.

7. The method according to claim 1, wherein the selected inventoried flag is always A for each session.

8. The method according to claim 1, wherein the reader identifier is a 5-bit number, and N=5.

* * * * *